UNITED STATES PATENT OFFICE.

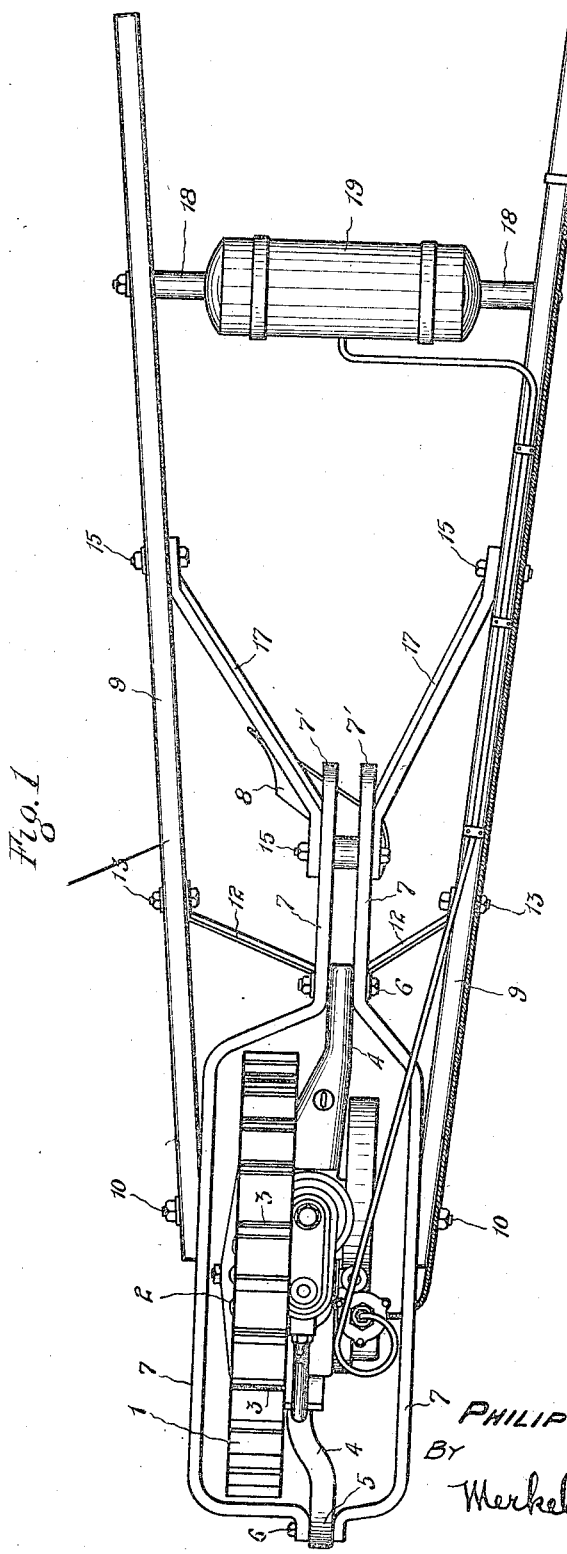

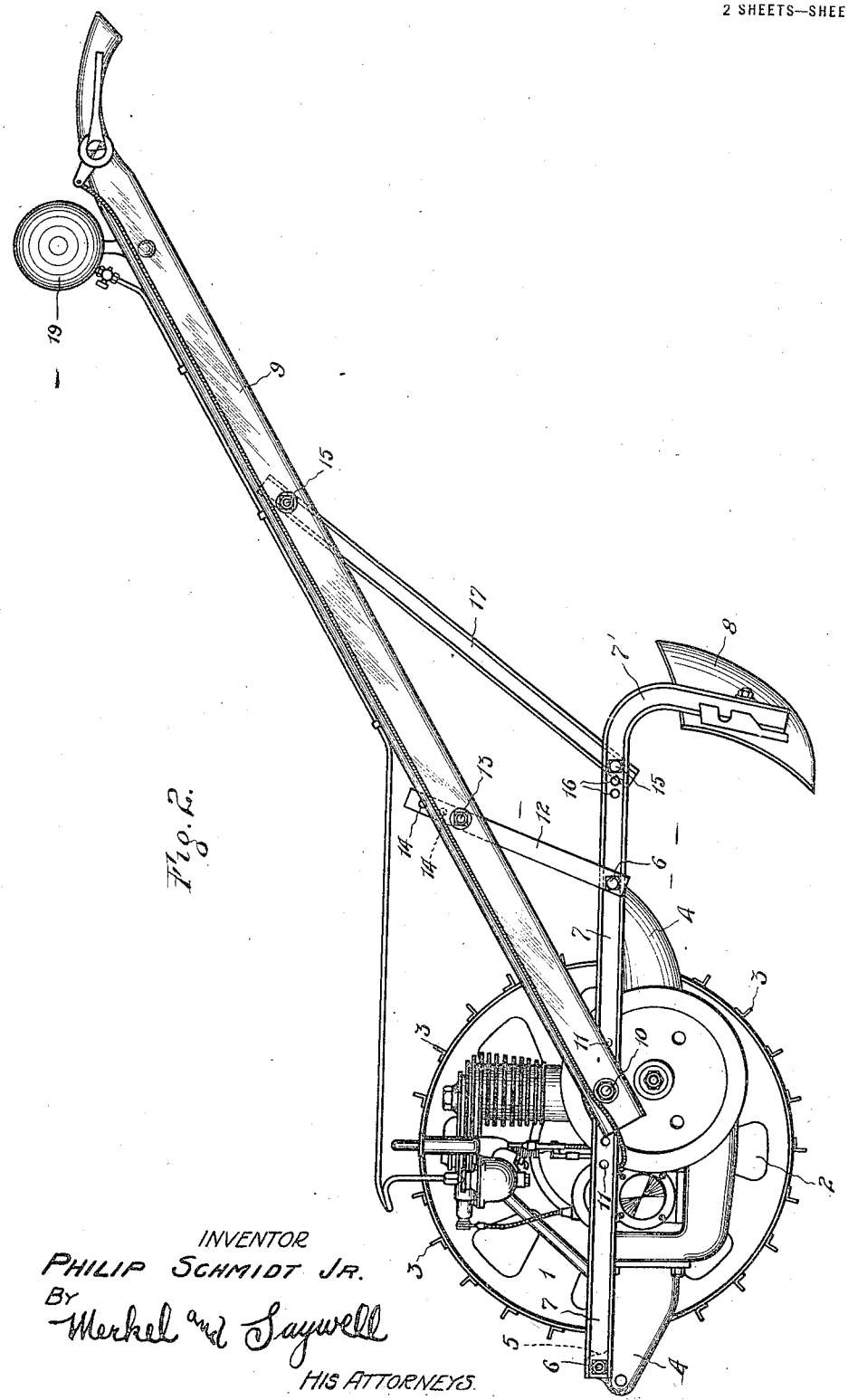

PHILIP SCHMIDT, JR., OF CLEVELAND, OHIO.

AGRICULTURAL IMPLEMENT.

1,281,852.

Specification of Letters Patent. Patented Oct. 15, 1918.

Application filed December 26, 1917. Serial No. 208,772.

*To all whom it may concern:*

Be it known that I, PHILIP SCHMIDT, Jr., a citizen of the United States, resident of Cleveland, county of Cuyahoga, and State of Ohio, have invented new and useful Improvements in Agricultural Implements, of which the following is a specification, the principle of the invention being herein explained and the best mode in which I have contemplated applying that principle, so as to distinguish it from other inventions.

My invention relates to agricultural implements and particularly to that class of said implements which are designed to be power driven. However, it can be used very efficiently simply as a wheel cultivator. It is intended that the principles of my invention shall find their most general application in truck gardening, cultivation of family garden plots and the working of small acreage although it is not thereby meant that the use of my improved implement is limited to the field indicated or to machines of a comparatively small size. My invention is further designed to make use of a standard self-propelled and self-supported mechanism such as the combination of a supporting tractor wheel provided with an internal combustion engine and formed with or supporting a platform member upon which the machine, whose operation and support by said self-propelled apparatus are desired, is mounted.

The annexed drawings and the following description set forth in detail certain means embodying my invention, the disclosed means, however, constituting but one of various mechanical forms in which the principle of the invention is applied.

In said annexed drawings:

Figure 1 represents a plan view of my new and improved agricultural implement, showing the same as propelled and supported by a standard self-propelled tractor wheel; Fig. 2 represents a side elevation of the combination shown in Fig. 1.

In the accompanying drawings, I have illustrated my improved implements as used with a standard form of self-propelled tractor wheel 1 known as the "Smith wheel", the face of said wheel being provided with air openings 2. I have utilized this "Smith wheel" as the body member of my improved implement and have removed the pneumatic tire common to said wheels and have provided a smooth rim upon which are secured traction members or grippers 3. These Smith wheels constitute no part of my invention but are utilized to furnish the general feature of a convenient body member and single supporting wheel for my improved agricultural implement. Of course, when said wheels are utilized, it is designed to use the power feature thereof and have a power driven implement, but whether the implement is hand-driven or power-driven forms no part of my invention. Said Smith wheels are formed with supporting platforms to forward and rearward ears 4 of which I have secured by means of bolts 6 a pair of laterally disposed frame members 7 formed as plainly shown in Fig. 1, said frame members being secured at their front ends to a small upwardly extending lug 5 secured to the forward ear 4. To the downwardly projecting rear end portion 7' of the frame members 7 I adjustably and removably secure any desired cultivating tool 8. Two handle members 9 are supported upon the frame members 7. This support is provided at the front end of said handle members 9 by bolts 10 disposed in any desired one of a plurality of holes 11 formed in the frame member 7 so that said handle members 9 are longitudinally adjustable of said frame members 7; and intermediately of the ends of the frame members 7 and the handle members 9 by supporting arms 12 and 17, the former of which are secured at one end by means of the rear bolt 6 to the frame members 7 and at or near their other ends by bolts 13 secured in any desired one of a plurality of holes 14 to the handle members 9; and the latter of which are secured at or near one end by bolt 15 in any desired one of a plurality of holes 16 formed in the frame members 7 and at their other ends by bolts 15 to the handle members 9. It is evident from the foregoing description that the handle members 9 are also vertically adjustable relatively to the frame members 7. Upon a transverse connecting arm 18 of the handle members 9 is supported the fuel supply tank 19 for the engine of the self-propelled wheel 1, whereby an efficient gravity feed for the fuel is provided. Between the gear formed upon the crank-shaft and the gear directly turning the tractor wheel I have provided a ratio of one to sixteen.

By the means hereinbefore described, I have designed an agricultural implement which will lend itself to any desired use for the cultivation of small acreages; which is economical in its initial cost and operation; and which will greatly extend the field within which, without the use of a number of comparatively costly machines, small operators can successfully carry on agricultural work.

What I claim is:

1. In an agricultural implement, the combination with a body member including a single supporting wheel; of a pair of frame members mounted upon and inclosing said body member, a tool secured to said frame-members, and vertically and longitudinally adjustable handle members mounted upon said frame members.

2. In an agricultural implement, the combination with a body member including a single supporting wheel; of a pair of oppositely disposed frame members mounted upon said body member and provided with contiguously disposed ends, respectively, and with laterally extending intermediate portions inclosing said body member, a tool secured to said frame-members, and handle members longitudinally adjustably secured at one end to the laterally extended portions of said frame members and vertically adjustably supported upon one of the contiguously disposed ends thereof.

Signed by me, this 5th day of December, 1917.

PHILIP SCHMIDT, Jr.